(12) United States Patent
Oberther

(10) Patent No.: US 8,911,129 B2
(45) Date of Patent: Dec. 16, 2014

(54) HEADLAMP TO BUMPER ATTACHMENT STRUCTURE

(71) Applicant: Toyota Motor Engineering & Manufacturing North America, Inc., Erlanger, KY (US)

(72) Inventor: Kevin Oberther, Covington, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 60 days.

(21) Appl. No.: 13/742,016

(22) Filed: Jan. 15, 2013

(65) Prior Publication Data

US 2014/0198518 A1 Jul. 17, 2014

(51) Int. Cl.
*B60Q 1/00* (2006.01)
*B60Q 1/04* (2006.01)

(52) U.S. Cl.
CPC .............. *B60Q 1/0441* (2013.01); *B60Q 1/04* (2013.01)
USPC .......................................... 362/546; 362/549

(58) Field of Classification Search
CPC .............................. B60Q 1/263; B60Q 1/2619
USPC .................................................. 362/546, 549
See application file for complete search history.

(56) References Cited

U.S. PATENT DOCUMENTS

| 7,207,617 | B2* | 4/2007 | Pelini .............................. 296/29 |
| 7,401,957 | B2 | 7/2008 | Kroll |
| 7,404,688 | B2 | 7/2008 | Schwab |
| 7,798,509 | B2* | 9/2010 | Ohzono ................... 280/152.05 |
| 7,815,349 | B2* | 10/2010 | Yoshino ........................ 362/505 |
| 7,841,651 | B2 | 11/2010 | Crainic et al. |
| 8,042,852 | B2* | 10/2011 | Onuma et al. ............... 296/1.08 |
| 2004/0184278 | A1* | 9/2004 | Cheron et al. ................ 362/505 |

* cited by examiner

*Primary Examiner* — Evan Dzierzynski
(74) *Attorney, Agent, or Firm* — Christopher G. Darrow; Young Basile Hanlon & MacFarlane P.C.

(57) ABSTRACT

A system, apparatus and method for attaching a bumper cover to a headlamp housing. The system includes a plurality of apertures defined in an upper portion of the bumper cover and a plurality of protrusions extending from a lower portion of the headlamp housing for engaging the plurality of apertures in the upper portion of the bumper cover. The system further includes a plurality of ribs extending from the lower portion of the headlamp housing for locating the upper portion of the bumper cover proximate to the lower portion of the headlamp housing. In this system, each rib of the plurality of ribs is located proximate to at least one protrusion of the plurality of protrusions.

20 Claims, 3 Drawing Sheets

A-A

B-B

C-C

HEADLAMP TO BUMPER ATTACHMENT STRUCTURE

BACKGROUND

The front end of a vehicle, such as an automobile, can include a pair of headlamps and a bumper cover extending below and between the headlamps to cover the front structure of the vehicle. Both the appearance of the front end of the vehicle and the ease of assembling the front end of the vehicle can be positively affected by including a small gap between the headlamps and the bumper cover. Including an effective attachment structure between the headlamps and bumper cover while controlling the appearance of the gap can pose challenges in design and manufacture.

SUMMARY

A system, apparatus, and method for attaching a bumper cover to a headlamp housing.

One aspect of the disclosed embodiments is a system for attaching a bumper cover to a headlamp housing. The system includes a plurality of apertures defined in an upper portion of the bumper cover and a plurality of protrusions extending from a lower portion of the headlamp housing for engaging the plurality of apertures in the upper portion of the bumper cover. The system further includes a plurality of ribs extending from the lower portion of the headlamp housing for locating the upper portion of the bumper cover proximate to the lower portion of the headlamp housing wherein each rib of the plurality of ribs is located proximate to at least one protrusion of the plurality of protrusions.

Another aspect of the disclosed embodiments is an apparatus, including a headlamp housing, capable of engaging an upper portion of a bumper cover. The headlamp housing includes an outer surface having a lower portion and a plurality of protrusions extending from the lower portion of the outer surface for engaging a plurality of apertures in the upper portion of the bumper cover. The headlamp housing further includes a plurality of ribs extending from the lower portion of the outer surface for locating the upper portion of the bumper cover proximate to the lower portion of the outer surface wherein each rib of the plurality of ribs is located proximate to at least one protrusion of the plurality of protrusions.

Another aspect of the disclosed embodiments is a method of attaching a bumper cover to a headlamp housing. The method includes defining a plurality of apertures in an upper portion of the bumper cover and forming a plurality of protrusions in a lower portion of the headlamp housing for engaging the plurality of apertures in the upper portion of the bumper cover. The method further includes forming a plurality of ribs in the lower portion of the headlamp housing for locating the upper portion of the bumper cover proximate to the lower portion of the headlamp housing and sliding the upper portion of the bumper cover against the lower portion of the headlamp housing above the plurality of ribs and below the plurality of protrusions until the plurality of protrusions engage the plurality of apertures.

BRIEF DESCRIPTION OF THE DRAWINGS

The description herein makes reference to the accompanying drawings wherein like reference numerals refer to like parts throughout the several views, and wherein.

DETAILED DESCRIPTION

The upper portion of the bumper cover can be flexible and prone to causing a wavy appearance at the interface to the headlamp housing. The fore-aft position of the upper portion of the bumper cover can vary along the length of the headlamp housing, as can the up-down position. These positional variations can cause both appearance and attachment concerns at the interface of the upper portion of the bumper cover and a lower portion of the headlamp housing.

A system, apparatus, and method for attaching a bumper cover to a headlamp housing are disclosed here. Both protrusions and ribs are formed in the lower portion of the headlamp housing for engaging the upper portion of the bumper cover. The protrusions are shaped to engage apertures formed in the upper portion of the bumper cover to control the fore-aft position of the bumper cover and the ribs are shaped and positioned to hold the upper portion of the bumper cover proximate to the lower portion of the headlamp housing to control the up-down position of the bumper cover. Together, the protrusions and ribs can minimize the variations in the fore-aft and up-down position of the bumper cover, improving appearance while providing for ease of assembly.

Figure 1:
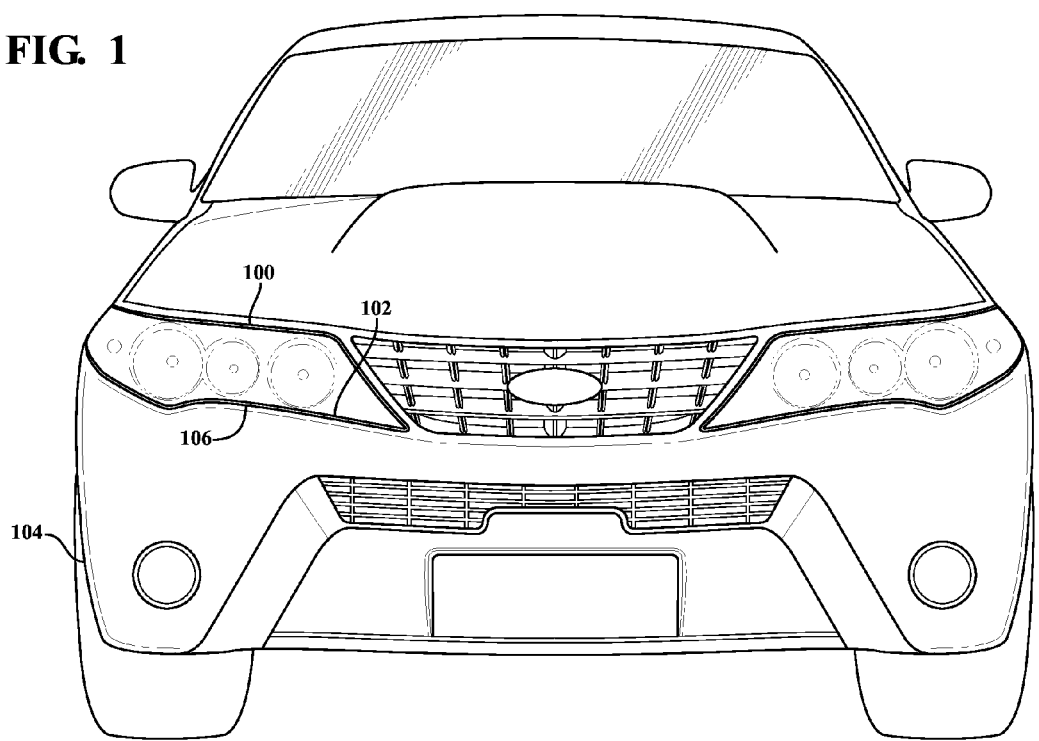
FIG. 1 is a front view of the front end of a vehicle in accordance with one or more embodiments.

FIG. 1 is a front view of the front end of a vehicle in accordance with one or more embodiments. The front end of the vehicle includes two headlamp housings 100, each including a lower portion 102. The front end of the vehicle also includes a bumper cover 104 extending below and between the headlamp housings 100. The bumper cover 104 can include a variety of openings for allowing airflow to enter a radiator and the engine box. The bumper cover 104 can also include various depressions and openings for installing vehicle decorations and vehicle lamps, such as vehicle badges and fog lamps.

The bumper cover 104 can include two upper portions 106 which can be positioned proximate to the lower portions 102 of the headlamp housings 100 during assembly. The upper portions 106 of the bumper cover 104 can be flexible, with tapered leading edges for sliding along the lower portions 102 of the headlamp housings 100 during installation. FIG. 1 also includes an oval outline indicating that a detailed view of the interface between the lower portion 102 of one of the headlamp housings 100 and one of the upper portions 106 of the bumper cover 104 can be seen in FIG. 2. This interface affects both manufacturing quality and appearance of the front end of the vehicle.

Figure 2:
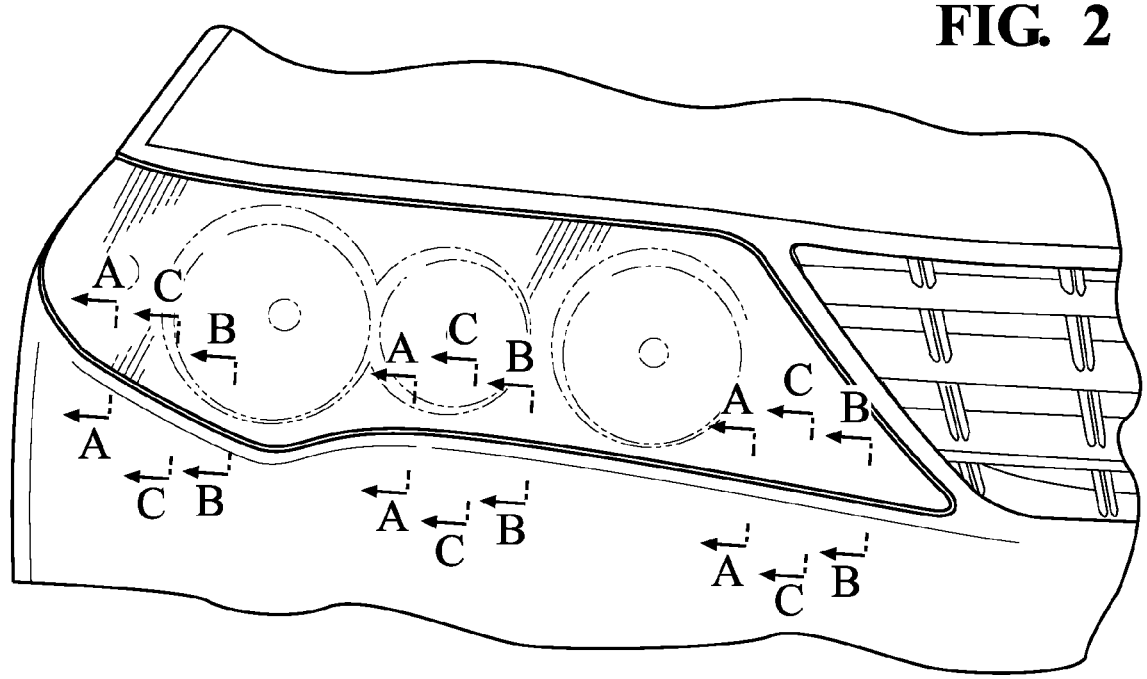
FIG. 2 is a detail view of a portion of the front end of the vehicle shown in FIG. 1.

FIG. 2 is a detail view of a portion of the front end of the vehicle shown in FIG. 1 in accordance with one or more embodiments. The detail view is focused on a portion of a single headlamp housing 100 with the lower portion 102 of the headlamp housing 100 adjacent to the upper portion 106 of the bumper cover 104. Example groupings of sections, repeated at spaced intervals, are shown at the interface between the headlamp housing 100 and the bumper cover 104. Section A-A is described below in detail in FIG. 3. Section B-B is described below in detail in FIG. 4. Section C-C is described below in detail in FIG. 5. The detail view of FIG. 2 indicates that a gap can be present between the lower portion 102 of the headlamp housing 100 and the upper portion 106 of the bumper cover 104. The appearance of the gap can be maintained using the attachment structures described below in FIGS. 3-5.

Figure 3:
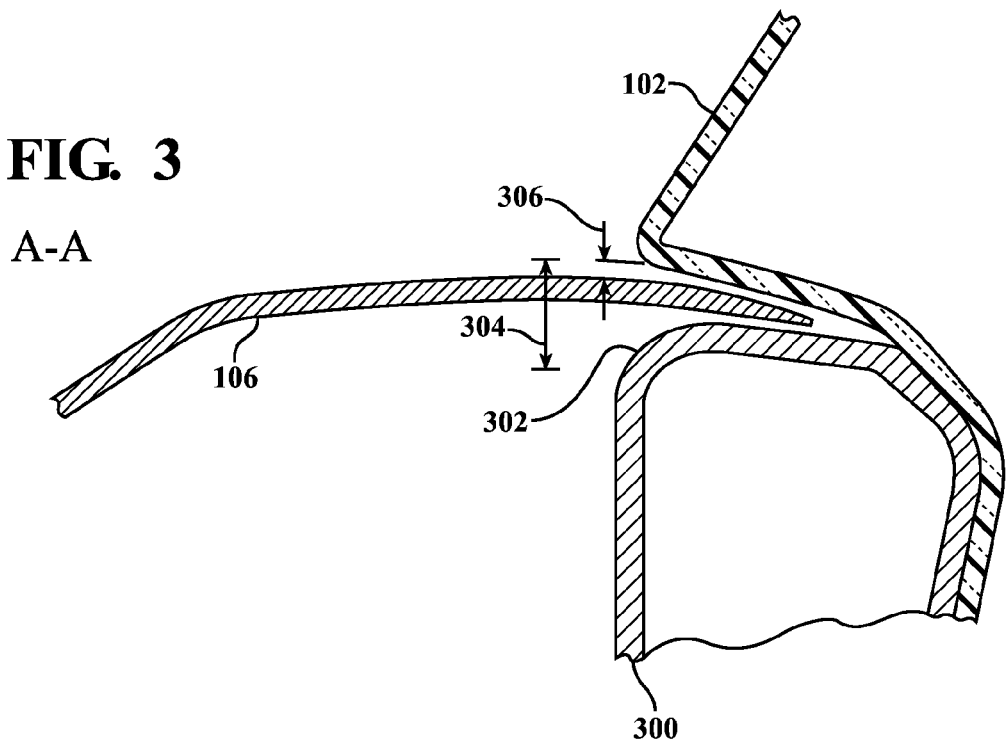
FIG. 3 is a sectional view through section A-A as shown in FIG. 2.

FIG. 3 is a sectional view through section A-A as shown in FIG. 2. Section A-A shows the lower portion 102 of the headlamp housing 100 and the upper portion 106 of the bumper cover 104. In addition, section A-A shows a rib 300 extending from the lower portion 102 of the headlamp housing 100. The rib 300 can aid in locating the upper portion 106 of the bumper cover 104 proximate to the lower portion 102 of the headlamp housing 100 and can prevent a sagging condition, that is, where the distance between the upper portion 106 of the bumper cover 104 and the lower portion 102 of the headlamp appears wider at one location than at other locations.

The rib 300 can include a front portion 302 having a rounded shape for receiving the upper portion 106 of the bumper cover 104 between the rib 300 and the lower portion 102 of the headlamp housing 100. The rounded shape of the front portion 302 of the rib 300 can provide a lead-in for the upper portion 106 of the bumper cover 104, facilitating the assembly process. Additionally, the upper portion 106 of the bumper cover 104 can have a tapered shape for ease of insertion into the gap 304 between the front portion 302 of the rib 300 and the lower portion 102 of the headlamp housing 100. The tapered shape of the upper portion 106 of the bumper cover 104 is shown in FIG. 3.

Section A-A can occur in multiple locations along the interface between the lower portion 102 of the headlamp housing 100 and the upper portion 106 of the bumper cover 104. That is, a plurality of ribs can extend from the lower portion 102 of the headlamp housing 100 along the interface to the upper portion 106 of the bumper cover 104. Each rib, such as rib 300, can be spaced apart from the rest of the plurality of ribs, providing up-down tolerance control of the gap 306 between the headlamp housing 100 and the bumper cover 104 along the entire length of the interface.

Figure 4:
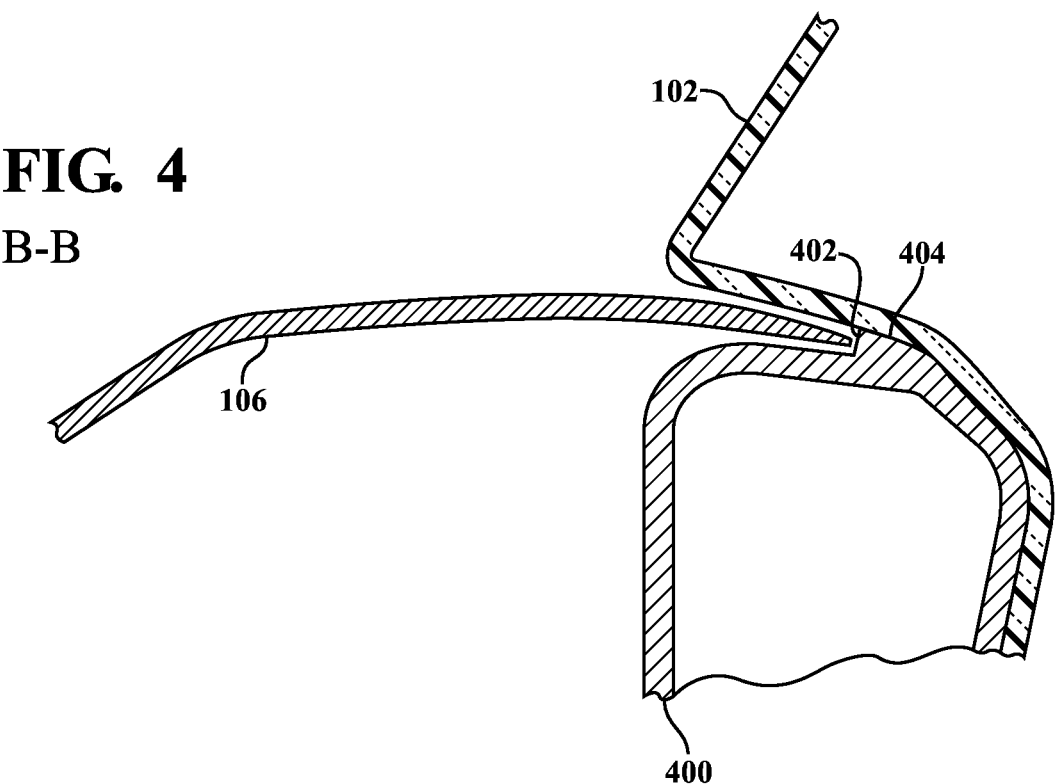
FIG. 4 is a sectional view through section B-B as shown in FIG. 2.

FIG. 4 is a sectional view through section B-B as shown in FIG. 2. Section B-B shows the lower portion 102 of the headlamp housing 100 and the upper portion 106 of the bumper cover 104. Section B-B also shows a rib 400 extending from the lower portion 102 of the headlamp housing 100. Section B-B differs from section A-A of FIG. 3 in that the rib 400 include a stop surface 402 extending from a center portion 404 of the rib 400 to an outer surface of the lower portion 102 of the headlamp housing 100 to aid in controlling the fore-aft position of the upper portion 106 of the bumper cover 104.

Section B-B can occur in multiple locations along the interface between the lower portion 102 of the headlamp housing 100 and the upper portion 106 of the bumper cover 104. As shown in FIG. 2, some locations along the interface between the bumper cover 104 and headlamp housing 100 can include ribs such as rib 400 shown in FIG. 4 and some locations can include ribs such as rib 300 shown in FIG. 3. Using both styles of ribs can allow for fine-tuning of the fore-aft and up-down position of the bumper cover 104 in relation to the headlamp housing 100. However, the lower portion 102 of the headlamp housing 100 can also include a plurality of ribs in a common style, e.g., either ribs such as rib 300 as shown in FIG. 3 or ribs such as rib 400 as shown in FIG. 4.

Figure 5:
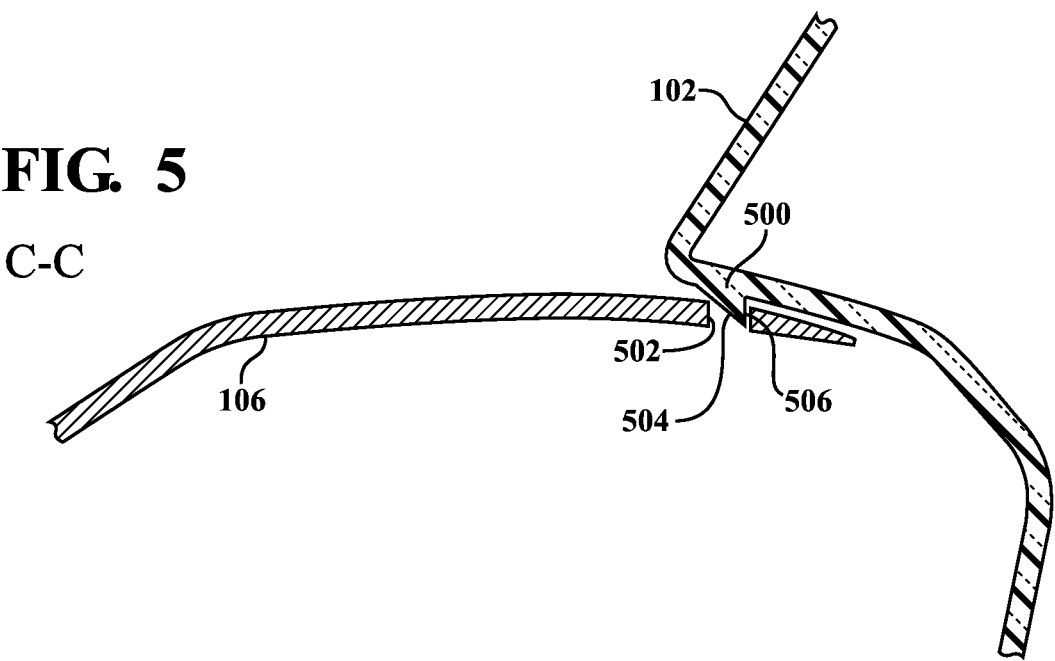
FIG. 5 is a sectional view through section C-C as shown in FIG. 2.

FIG. 5 is a sectional view through section C-C as shown in FIG. 2. Section C-C shows the lower portion 102 of the headlamp housing 100 and the upper portion 106 of the bumper cover 104. Section C-C also shows a protrusion 500 extending from the lower portion 102 of the headlamp housing 100 and a aperture 502 defined in the upper portion 106 of the bumper cover 104. The protrusion 500 can be formed, molded, or attached using any other method to an outer surface of the lower portion 102 of the headlamp housing 100. The aperture 502 can be stamped, drilled, formed, or defined using any other method within the upper portion 106 of the bumper cover 104.

The protrusion 500 is designed to engage the aperture 502 to control the fore-aft position of the upper portion 106 of the bumper cover 104 in respect to the lower portion 102 of the headlamp housing 100. The protrusion 500 can include a front surface 504 having an angled shape for allowing the upper portion 106 of the bumper cover 104 to slide along the protrusion 500 when engaging the bumper cover 104 to the headlamp housing 100. The protrusion 500 can also include a back surface 506 having a vertical wall for engaging a vertical wall in the aperture 502 in the upper portion 106 of the bumper cover 104. One the back surface 506 of the protrusion 500 engages the aperture 502, forward motion of the upper portion 106 of the bumper cover 104 is inhibited.

Section C-C can occur in multiple locations along the interface between the lower portion 102 of the headlamp housing 100 and the upper portion 106 of the bumper cover 104. That is, a plurality of protrusions can extend from the lower portion 102 of the headlamp housing 100 and a plurality of apertures can be defined in the upper portion 106 of the bumper cover 104 along the interface between the bumper cover 104 and headlamp housing 100. Each protrusion, such as protrusion 500, can be spaced apart from the rest of the plurality of protrusions. Each aperture, such as aperture 502, can also be spaced apart from the rest of the plurality of apertures. The attachment scheme of using the plurality of protrusions to engage the plurality of apertures can provide fore-aft tolerance control of the position of the upper portion 106 of the bumper cover 104 in respect to the headlamp housing 100 along the entire length of the interface.

Sections A-A, B-B, and C-C can be arranged in a variety of ways along the interface of the bumper cover 104 and the headlamp housing 100 to implement the attachment system described above. In one example, such as that shown in FIG. 2, each protrusion, such as protrusion 500 of FIG. 5, can be located between two ribs, such as rib 300 of FIG. 3 and rib 400 of FIG. 4. In another example, each rib can be located between two protrusions. The attachment system is designed such that each rib is located proximate to at least one protrusion to provide both fore-aft and up-down position control in that area of the interface.

One example method of implementing the attachment system includes defining a plurality of apertures in the upper portion 106 of the bumper cover 104. As described above, the apertures can be stamped, drilled, formed, or defined using any other method. The method also includes forming a plurality of protrusions in the lower portion 102 of the headlamp housing 100 to engage the plurality of apertures in the upper portion 106 of the bumper cover 104. As described above, the protrusions can be formed, molded, or attached using any other method to the outer surface of the lower portion 102 of the headlamp housing 100. Each protrusion is spaced along the lower portion 102 of the headlamp housing 100 so that it aligns with a aperture present in the upper portion 106 of the bumper cover 104.

The method also includes forming a plurality of ribs in the lower portion 102 of the headlamp housing 100 to aid in locating the upper portion 106 of the bumper cover 104 proximate to the lower portion 102 of the headlamp housing 100. Each rib can be spaced along the lower portion 102 of the headlamp housing 100 so that it is proximate to at least one protrusion. In other words, the protrusions and ribs formed on the lower portion 102 of the headlamp housing 100 can alternate in a manner consistent with the sections A-A, B-B, and C-C shown in FIG. 2.

The method also includes sliding the upper portion 106 of the bumper cover 104 against the lower portion 102 of the headlamp housing 100 above the plurality of ribs and below the plurality of protrusions until the plurality of protrusions engage the plurality of apertures. The upper portion 106 of the bumper cover 104 can include a tapered edge allowing easier installation. For example, as shown in FIG. 3, the tapered edge of the upper portion 106 can allow the bumper cover 104 to slide more easily between rib 300 and lower portion 102. As another example, as shown in FIG. 5, the tapered edge of the upper portion 106 can slide against the front surface 504 of protrusion 500, bending down the flexible edge of upper portion 106 until the back surface 506 of protrusion 500 engages a vertical wall within aperture 502. The attachment system controls the fore-aft position of the upper portion 106 of the bumper cover 104 using the protrusions and apertures and the fore-aft and up-down position of the upper portion 106 of the bumper cover 104 using the ribs.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A system for attaching a bumper cover to a headlamp housing, comprising:
    a plurality of apertures defined in an upper portion of the bumper cover;
    a plurality of protrusions extending from a lower portion of the headlamp housing for engaging the plurality of apertures in the upper portion of the bumper cover; and
    a plurality of ribs extending from the lower portion of the headlamp housing for locating the upper portion of the bumper cover proximate to the lower portion of the headlamp housing wherein each rib of the plurality of ribs is located proximate to, separate and laterally spaced from at least one protrusion of the plurality of protrusions.

2. The system of claim 1, wherein each rib of the plurality of ribs is spaced apart from the rest of the plurality of ribs and wherein each protrusion of the plurality of protrusions is spaced apart from the rest of the plurality of protrusions.

3. The system of claim 2, wherein each aperture of the plurality of apertures is spaced for alignment with one protrusion of the plurality of protrusions.

4. The system of claim 2, wherein each protrusion of the plurality of protrusions is located between two ribs of the plurality of ribs.

5. The system of claim 2, wherein each rib of the plurality of ribs is located between two protrusions of the plurality of protrusions.

6. The system of claim 1, wherein each protrusion of the plurality of protrusions includes a front surface having an angled shape for allowing the upper portion of the bumper cover to slide along the protrusion when engaging the bumper cover to the headlamp housing.

7. The system of claim 1, wherein each protrusion of the plurality of protrusions includes a back surface having a vertical wall for engaging a vertical wall in any one of the apertures in the upper portion of the bumper cover.

8. A system for attaching a bumper cover to a headlamp housing comprising:
    a plurality of apertures defined in an upper portion of the bumper cover;
    a plurality of protrusions extending from a lower portion of the headlamp housing for engaging the plurality of apertures in the upper portion of the bumper cover;
    a plurality of ribs extending from the lower portion of the headlamp housing for locating the upper portion of the bumper cover proximate to the lower portion of the headlamp housing wherein each rib of the plurality of ribs is located proximate to, at least one protrusion of the plurality of protrusions; and
    wherein at least some ribs of the plurality of ribs include a stop surface extending from a center portion of the rib to an outer surface of the lower portion of the headlamp housing for controlling the fore-aft position of the upper portion of the bumper cover.

9. A system for attaching a bumper cover to a headlamp housing comprising:
    a plurality of apertures defined in an upper portion of the bumper cover;
    a plurality of protrusions extending from a lower portion of the headlamp housing for engaging the plurality of apertures in the upper portion of the bumper cover;
    a plurality of ribs extending from the lower portion of the headlamp housing for locating the upper portion of the bumper cover proximate to the lower portion of the headlamp housing wherein each rib of the plurality of ribs is located proximate to, at least one protrusion of the plurality of protrusions; and
    wherein at least some ribs of the plurality of ribs include a stop surface extending from a center portion of the rib to an outer surface of the lower portion of the headlamp housing for controlling the fore-aft position of the upper portion of the bumper cover.

10. The system of claim 9, wherein the upper portion of the bumper cover has a tapered shape for insertion into a gap formed between the front portions of the plurality of ribs and the lower portion of the headlamp housing.

11. A headlamp housing capable of engaging an upper portion of a bumper cover, comprising:
    an outer surface having a lower portion;
    a plurality of protrusions extending from the lower portion of the outer surface for engaging a plurality of apertures in the upper portion of the bumper cover; and
    a plurality of ribs extending from the lower portion of the outer surface for locating the upper portion of the bumper cover proximate to the lower portion of the outer surface wherein each rib of the plurality of ribs is located proximate to separate and laterally spaced from at least one protrusion of the plurality of protrusions.

12. The headlamp housing of claim 11, wherein each rib of the plurality of ribs is spaced apart from the rest of the plurality of ribs and wherein each protrusion of the plurality of protrusions is spaced apart from the rest of the plurality of protrusions.

13. The headlamp housing of claim 12, wherein each protrusion of the plurality of protrusions is located between two ribs of the plurality of ribs.

14. The headlamp housing of claim 12, wherein each rib of the plurality of ribs is located between two protrusions of the plurality of protrusions.

15. The headlamp housing of claim 11, wherein each protrusion of the plurality of protrusions includes a front surface having an angled shape for allowing the upper portion of the bumper cover to slide along the protrusion when engaging the bumper cover to the headlamp housing.

16. The headlamp housing of claim 11, wherein each protrusion of the plurality of protrusions includes a back surface having a vertical wall for engaging a vertical wall in any one of the apertures in the upper portion of the bumper cover.

17. A headlamp housing capable of engaging an upper portion of a bumper cover, comprising:
an outer surface having a lower portion;
a plurality of protrusions extending from the lower portion of the outer surface for engaging a plurality of apertures in the upper portion of the bumper cover; and
a plurality of ribs extending from the lower portion of the outer surface for locating the upper portion of the bumper cover proximate to the lower portion of the outer surface wherein each rib of the plurality of ribs is located proximate to at least one protrusion of the plurality of protrusions; and
wherein at least some of the plurality of ribs include a stop surface extending from a center portion of the rib to an outer surface of the lower portion of the headlamp housing for controlling the fore-aft position of the upper portion of the bumper cover.

18. A system for attaching a bumper cover to a headlamp housing, comprising:
an outer surface having a lower portion;
a plurality of protrusions extending from the lower portion of the outer surface for engaging a plurality of apertures in the upper portion of the bumper cover; and
a plurality of ribs extending from the lower portion of the outer surface for locating the upper portion of the bumper cover proximate to the lower portion of the outer surface wherein each rib of the plurality of ribs is located proximate at least one protrusion of the plurality of protrusions; and
wherein each rib of the plurality of ribs includes a front portion having a rounded shape for receiving the upper portion of the bumper cover between the rib and the lower portion of the headlamp housing.

19. A method of attaching a bumper cover to a headlamp housing, including:
defining a plurality of apertures in an upper portion of the bumper cover;
forming a plurality of protrusions in a lower portion of the headlamp housing for engaging the plurality of holes in the upper portion of the bumper cover;
forming a plurality of ribs in the lower portion of the headlamp housing for locating the upper portion of the bumper cover proximate to the lower portion of the headlamp housing, wherein each rib of the plurality of ribs is separate and spaced from the plurality of protrusions; and
sliding the upper portion of the bumper cover against the lower portion of the headlamp housing above the plurality of ribs and below the plurality of protrusions until the plurality of protrusions engage the plurality of apertures.

20. A method of attaching a bumper cover to a headlamp housing, including:
defining a plurality of apertures in an upper portion of the bumper cover;
forming a plurality of protrusions in a lower portion of the headlamp housing for engaging the plurality of holes in the upper portion of the bumper cover;
forming a plurality of ribs in the lower portion of the headlamp housing for locating the upper portion of the bumper cover proximate to the lower portion of the headlamp housing; and
sliding the upper portion of the bumper cover against the lower portion of the headlamp housing above the plurality of ribs and below the plurality of protrusions until the plurality of protrusions engage the plurality of aperture
wherein at least some ribs of the plurality of ribs including a stop surface extending from a center portion of the rib to an outer surface of the lower portion of the headlamp housing for controlling the fore-aft position of the upper portion of the bumper cover.

* * * * *